US009083685B2

(12) United States Patent
Lin et al.

(10) Patent No.: US 9,083,685 B2
(45) Date of Patent: Jul. 14, 2015

(54) METHOD AND SYSTEM FOR CONTENT REPLICATION CONTROL

(75) Inventors: Jason T. Lin, Santa Clara, CA (US); Fabrice E. Jogand-Coulomb, San Carlos, CA (US)

(73) Assignee: SanDisk Technologies Inc., Plano, TX (US)

( * ) Notice: Subject to any disclaimer, the term of this patent is extended or adjusted under 35 U.S.C. 154(b) by 574 days.

(21) Appl. No.: 12/478,688

(22) Filed: Jun. 4, 2009

(65) Prior Publication Data

US 2010/0310075 A1     Dec. 9, 2010

(51) Int. Cl.
*G06F 21/00* (2013.01)
*H04L 29/06* (2006.01)
*G06F 21/10* (2013.01)
*G11B 20/00* (2006.01)

(52) U.S. Cl.
CPC ............. *H04L 63/062* (2013.01); *G06F 21/10* (2013.01); *G11B 20/00086* (2013.01); *G11B 20/00224* (2013.01); *G11B 20/00478* (2013.01); *G11B 20/00492* (2013.01); *H04L 63/0823* (2013.01)

(58) Field of Classification Search
USPC .............. 705/56, 16, 21, 59, 71; 380/44, 262, 380/278, 279
See application file for complete search history.

(56) References Cited

U.S. PATENT DOCUMENTS

| | | | |
|---|---|---|---|
| 5,802,175 A | 9/1998 | Kara | |
| 6,550,011 B1 | 4/2003 | Sims, III | |
| 6,857,071 B1 | 2/2005 | Nakae | |
| 6,865,550 B1 | 3/2005 | Cok | |
| 6,968,459 B1 | 11/2005 | Morgan et al. | |
| 6,981,152 B2 * | 12/2005 | Du et al. ...................... | 713/193 |
| 7,010,808 B1 | 3/2006 | Leung et al. | |
| 7,036,020 B2 | 4/2006 | Thibadeau | |

(Continued)

FOREIGN PATENT DOCUMENTS

CN     1479921 A     3/2004
EP     1 505 595     2/2005

(Continued)

OTHER PUBLICATIONS

"CPRM and CPXM: Enabling New Business Models for Robust Delivery of Premium Digital Content," www.4CEntity.com, 4 pages, printed Jun. 1, 2009.

(Continued)

*Primary Examiner* — Dante Ravetti
(74) *Attorney, Agent, or Firm* — Brinks Gilson & Lione

(57) ABSTRACT

A method and system for content replication control are provided. In one embodiment, a content replication system receives a request to replicate content in a plurality of memory devices, wherein each memory device is associated with a respective unique identifier. For each of the plurality of memory devices, the content replication system sends a request to a transport encryption key server for a transport encryption key, the request including the unique identifier of the memory device. If the unique identifier of the memory device is authorized to receive the transport encryption key, the content replication system receives the transport encryption key and sends the transport encryption key to the memory device. The content replication system then receives encrypted content from a content server, wherein the encrypted content is encrypted with the transport encryption key. The content replication system then sends the encrypted content to the plurality of memory devices.

16 Claims, 8 Drawing Sheets

(56) References Cited

U.S. PATENT DOCUMENTS

| | | |
|---|---|---|
| 7,062,622 B2 | 6/2006 | Peinado |
| 7,073,063 B2 | 7/2006 | Peinado |
| 7,149,722 B1 | 12/2006 | Abburi |
| 7,215,771 B1 | 5/2007 | Hamlin |
| 7,426,747 B2 | 9/2008 | Thibadeau |
| 7,493,656 B2 | 2/2009 | Goodwill et al. |
| 7,549,044 B2 | 6/2009 | Lee et al. |
| 7,549,057 B2 | 6/2009 | Sciupac |
| 7,562,052 B2 | 7/2009 | Dezonno |
| 7,567,671 B2 | 7/2009 | Gupte |
| 7,631,195 B1 | 12/2009 | Yu et al. |
| 7,660,983 B1 | 2/2010 | Srivastava et al. |
| 7,738,662 B2 | 6/2010 | Asano et al. |
| 7,818,587 B2 | 10/2010 | Drew et al. |
| 8,051,302 B1 | 11/2011 | Hatanaka et al. |
| 8,060,926 B1 | 11/2011 | Ebrahimi et al. |
| 2002/0034302 A1 | 3/2002 | Moriai et al. |
| 2002/0035492 A1 | 3/2002 | Nonaka |
| 2002/0184154 A1 | 12/2002 | Hori et al. |
| 2002/0184492 A1* | 12/2002 | Hori et al. ............. 713/158 |
| 2003/0041253 A1 | 2/2003 | Matsui et al. |
| 2003/0161473 A1 | 8/2003 | Fransdonk |
| 2005/0005148 A1 | 1/2005 | Ishibashi et al. |
| 2005/0125681 A1 | 6/2005 | Bressy et al. |
| 2005/0210236 A1 | 9/2005 | Lee et al. |
| 2005/0216763 A1 | 9/2005 | Lee et al. |
| 2006/0041905 A1 | 2/2006 | Wasilewski |
| 2006/0129490 A1 | 6/2006 | Collar et al. |
| 2006/0155651 A1 | 7/2006 | Oh et al. |
| 2006/0176839 A1 | 8/2006 | Frazer et al. |
| 2006/0210082 A1 | 9/2006 | Devadas et al. |
| 2006/0218647 A1 | 9/2006 | Hars et al. |
| 2006/0239450 A1 | 10/2006 | Holtzman et al. |
| 2006/0271483 A1* | 11/2006 | Ernst et al. ............. 705/51 |
| 2006/0282662 A1 | 12/2006 | Whitcomb |
| 2007/0016941 A1 | 1/2007 | Gonzalez et al. |
| 2007/0033419 A1 | 2/2007 | Kocher et al. |
| 2007/0043667 A1 | 2/2007 | Qawami et al. |
| 2007/0061528 A1 | 3/2007 | Shibata et al. |
| 2007/0098152 A1 | 5/2007 | Detrick et al. |
| 2007/0098177 A1 | 5/2007 | Asano et al. |
| 2007/0143445 A1 | 6/2007 | Dandekar et al. |
| 2007/0180496 A1 | 8/2007 | Fransdonk |
| 2007/0217604 A1 | 9/2007 | Yanamoto |
| 2007/0263875 A1 | 11/2007 | Kitaya et al. |
| 2008/0010450 A1 | 1/2008 | Holtzman et al. |
| 2008/0010455 A1 | 1/2008 | Holtzman et al. |
| 2008/0013725 A1* | 1/2008 | Kobayashi ............. 380/203 |
| 2008/0013726 A1* | 1/2008 | Kuriya et al. ............. 380/210 |
| 2008/0022413 A1 | 1/2008 | Holtzman et al. |
| 2008/0063309 A1 | 3/2008 | Ohkawa |
| 2008/0114980 A1 | 5/2008 | Sridhar |
| 2008/0189781 A1 | 8/2008 | Pathak et al. |
| 2008/0212780 A1 | 9/2008 | Lemma et al. |
| 2008/0294908 A1 | 11/2008 | Yamaguchi et al. |
| 2009/0013725 A1* | 1/2009 | Kano ............. 65/99.1 |
| 2009/0022320 A1 | 1/2009 | Furukawa et al. |
| 2009/0041244 A1* | 2/2009 | Lee et al. ............. 380/259 |
| 2009/0052670 A1 | 2/2009 | You et al. |
| 2009/0086978 A1* | 4/2009 | McAvoy et al. ............. 380/279 |
| 2009/0113116 A1 | 4/2009 | Thompson et al. |
| 2009/0119216 A1 | 5/2009 | Dalla Valle |
| 2009/0249084 A1 | 10/2009 | Ogawa |
| 2009/0290711 A1 | 11/2009 | Bloom et al. |
| 2010/0034389 A1 | 2/2010 | Sakharaov |
| 2010/0211787 A1 | 8/2010 | Bukshpun et al. |
| 2010/0275036 A1* | 10/2010 | Harada et al. ............. 713/189 |
| 2010/0310075 A1 | 12/2010 | Lin et al. |
| 2010/0310076 A1 | 12/2010 | Barzilai et al. |
| 2011/0010720 A1 | 1/2011 | Smith et al. |
| 2011/0010770 A1 | 1/2011 | Smith et al. |
| 2012/0023331 A1 | 1/2012 | Altmann |

FOREIGN PATENT DOCUMENTS

| | | |
|---|---|---|
| JP | 2001-075923 | 3/2001 |
| JP | 2001-184314 | 7/2001 |
| JP | 2002-169912 | 6/2002 |
| JP | 2003-158514 | 5/2003 |
| JP | 2004-531914 | 10/2004 |
| JP | 2004-326152 | 11/2004 |
| JP | 2005-102021 | 4/2005 |
| JP | 2005-275441 | 10/2005 |
| TW | 200717252 | 5/2007 |
| WO | WO 00/07329 | 2/2000 |
| WO | WO 01/41356 | 6/2001 |
| WO | WO 01/43339 | 6/2001 |
| WO | WO 2007/030760 | 3/2007 |
| WO | WO 2007/144388 | 12/2007 |
| WO | WO 2008/021594 | 2/2008 |
| WO | WO 2009/070430 A2 | 6/2009 |

OTHER PUBLICATIONS

"Method for Performing Double Domain Encryption in a Memory Device," U.S. Appl. No. 12/478,691, filed Jun. 4, 2009, inventors: Ron Barzilai and Michael Holtzman.

International Search Report and Written Opinion for PCT Application Serial No. PCT/US2010/033666, dated Jul. 15, 2010, 9 pages.

International Search Report and Written Opinion for PCT Application Serial No. PCT/US2010/033669, dated Aug. 6, 2010, 12 pages.

U.S. Appl. No. 12/947,034 entitled, "Method and System for Refreshing Content in a Storage Device", filed Nov. 16, 2010, 36 pages.

Office Action for U.S. Appl. No. 12/478,691, dated May 9, 2012, 18 pages.

Office Action for U.S. Appl. No. 12/947,034, dated Dec. 3, 2012, 15 pages.

Office Action for U.S. Appl. No. 11/863,714 dated Oct. 4, 2010, 12 pages.

Office Action for U.S. Appl. No. 11/863,714 dated Mar. 9, 2011, 13 pages.

Office Action for U.S. Appl. No. 11/863,714, dated Apr. 24, 2013, 19 pages.

Office Action for U.S. Appl. No. 12/947,034, dated Apr. 29, 2013, 16 pages.

Office Action for European Patent Application Serial No. 08835108.5, dated Apr. 12, 2013, 5 pages.

Decision of Refusal for Japanese Patent Application Serial No. 2010-526993, dated Mar. 12, 2013, 10 pages.

Office Action for U.S. Appl. No. 11/863,714 dated Oct. 16, 2013, 21 pages.

Office Action for U.S. Appl. No. 12/947,034 dated Oct. 21, 2013, 15 pages.

Office Action for Chinese Patent Application Serial No. 2010800247288 dated Nov. 14, 2013, 11 pages.

Office Action for Taiwanese Patent Application Serial No. 097133343 dated Nov. 27, 2013, 6 pages.

Notice of Allowance for U.S. Appl. No. 11/863,714 dated Feb. 27, 2014, 15 pages.

Office Action for U.S. Appl. No. 12/947,034 dated Feb. 25, 2015, 19 pages.

Office Action issued in Chinese Patent Application No. 2010800247288, mailed May 29, 2014, 11 pages.

Office Action for U.S. Appl. No. 12/947,034 dated May 12, 2014, 18 pages.

Office Action from Chinese Patent Application Serial No. 2008801009345, dated Aug. 9, 2012, 21 pages.

English Translation of Office Action dated Aug. 24, 2011 issued in Chinese Patent Application No. 2008801009345, 8 pages.

International Search Report and Written Opinion of the International Searching Authority for International Application No. PCT/US2008/074428 dated Jan. 21, 2009, 17 pages.

Office Action dated Apr. 21, 2011 issued in European Patent Application No. 08835108.5, 5 pages.

(56) References Cited

OTHER PUBLICATIONS

Schneier, B., "Applied Crypotograph: Protocols, Algorithms, and Source Code in C", Jan. 1, 1996. pp. 167-177, XP002148578, John Wiley & Sons, New York, US.

Notification of Reasons for Refusal for Japanese Patent Application Serial No. 2010-526993, dated Nov. 13, 2012, 6 pages.
Rejection Decision for Chinese Patent Application Serial No. 2010800247288 dated Oct. 8, 2014, 12 pages.

* cited by examiner

METHOD AND SYSTEM FOR CONTENT REPLICATION CONTROL

BACKGROUND

To distribute content to optical discs and other storage devices, a content owner, such as a studio, releases content to a replication facility, which replicates the content onto the storage devices. Since the content owner does not have much control as to what happens in the replication facility, the content owner relies on trust and process control of each particular replication facility to make sure illegal or unauthorized copies of the content are not taking place. Accordingly, content providers do not have precise control over how many copies of the content are being made once the content is released to the replication facility. As a result, content owners do not know if unauthorized copies of the content are being made. Further, content is often delivered to a memory device in encrypted form and stored in the memory device in that encrypted form. Unfortunately, if an unauthorized party gains access to the key used to encrypt the content, the unauthorized party would have access to the content.

SUMMARY

Embodiments of the present invention are defined by the claims, and nothing in this section should be taken as a limitation on those claims.

By way of introduction, the embodiments described below generally relate to a method and system for content replication control. In one embodiment, a content replication system receives a request to replicate content in a plurality of memory devices, wherein each memory device is associated with a respective unique identifier. For each of the plurality of memory devices, the content replication system sends a request to a transport encryption key server for a transport encryption key, the request including the unique identifier of the memory device. If the unique identifier of the memory device is authorized to receive the transport encryption key, the content replication system receives the transport encryption key and sends the transport encryption key to the memory device. The content replication system then receives encrypted content from a content server, wherein the encrypted content is encrypted with the transport encryption key. The content replication system then sends the encrypted content to the plurality of memory devices.

Other embodiments are provided, and each of the embodiments can be used alone or together in combination. Various embodiments will now be described with reference to the attached drawings.

DETAILED DESCRIPTION OF THE PRESENTLY PREFERRED EMBODIMENTS

Introduction

The following embodiments provide a method and system for content replication control, as well as a memory device and method for double domain encryption. While these embodiments can be used with one another, it is important to note that the content replication control embodiments can be used with memory devices other than those that provide double domain encryption and that memory devices with double domain encryption can be used with applications other than content replication control.

The following sections provide a discussion of content replication control, followed by a discussion of a memory device with double domain encryption features and a discussion of content replication control using a memory device with double domain encryption features.

Content Replication Control

Figure 1:
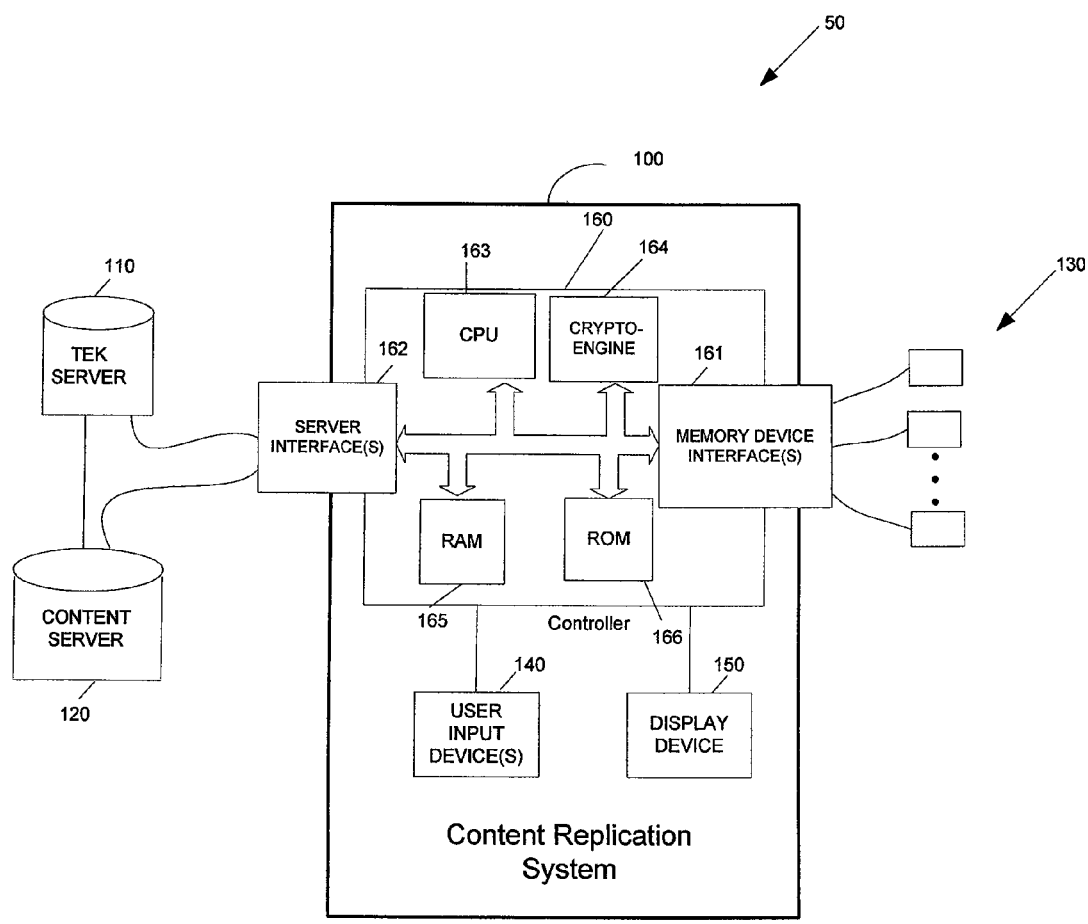
FIG. 1 is a representation of a content replication control system of an embodiment.

Turning now to the drawings, FIG. 1 is a representation of a content replication control system 50 of an embodiment. This system 50 comprises a content replication system 100 in communication with a transport encryption key ("TEK") server 110, a content server 120, and a plurality of memory devices 130. As will be described in more detail below, the content replication system 100, TEK server 110, and content server 120 can be located at the same site as the content replication system 100 (e.g., all three components in one manufacturing center or in a kiosk), or one or both of the TEK server 110 and the content server 120 can be remotely located from the site of the content replication system 100. Further, in some circumstances, the content replication system 100 can also function as the TEK server 110. Also, as will be discussed in more detail below, there can be a connection between the TEK server 110 and the content server 120, where the TEK is requested by the content server 120 based on a replication ID or other information.

As used herein, "content" can take any suitable form, such as, but not limited to, digital video (with or without accompanying audio) (e.g., a movie, an episode of a TV show, a news program, etc.), audio (e.g., a song, a podcast, one or a series of sounds, an audio book, etc.), still or moving images (e.g., a photograph, a computer-generated display, etc.), text (with or without graphics) (e.g., an article, a text file, etc.), a video game, and a hybrid multi-media presentation of two or more of these forms. A "memory device" can also take any suitable form. In one embodiment, a memory device takes the form of a solid-state (e.g., flash) memory device and can be one-time programmable, few-time programmable, or many-time programmable. However, other forms of memory, such as optical memory and magnetic memory, can be used. In one embodiment, the memory device takes the form of a handheld, removable memory card, an embedded memory card, a universal serial bus (USB) device, or a removable or non-removable hard drive, such as a solid-state drive.

In general, the content replication system 100 is used to replicate content received from the content server 120 onto the plurality of memory devices 130. The content stored in each of the memory devices is received encrypted with a transport encryption key from the TEK server 110, and any authorized memory device needs this transport encryption key in order to decrypt and use the content. (Even thought the TEK is called a "transport" encryption key, it should be noted that the content could be ciphered before transport with that key.) In this embodiment, each memory device is associated with a respective unique identifier, and the content replication system 100 supplies a given memory device with the TEK needed to decrypt the content only if the unique identifier of the memory device is authorized to receive the TEK. (In some embodiments, the unique identifier is part of a certificate, and the TEK is securely received (e.g., ciphered using a public key from the certificate or loaded with a secure channel resulting from authentication involving that a certificate).) This connection between memory device identifier and TEK allows a content owner to have precise control over how many copies of content are being made once the content image is released to the replication facility. As compared to replication techniques that rely on trust and process control of each particular replication facility to make sure illegal or unauthorized copies of content are not taking place, these embodiments provide content owners with precise replication control of their content.

As shown in FIG. 1, the content replication system 100 of this embodiment comprises user input device(s) 140 (e.g., a keyboard, a mouse, etc.) and a display device 150, through which a user can input and review data to initiate a content replication session. Although shown as separate components, the user input device(s) 140 and the display device 150 can be integrated, such as when the display device 150 takes the form of a touch-screen display. The user input device(s) 140 and the display device 150 are in communication with a controller 160. In one embodiment, the content replication system 100 takes the form of a computer with a WinXP card reader.

In this embodiment, the controller 160 comprises a central processing unit ("CPU") 163, a crypto-engine 364 operative to provide encryption and/or decryption operations, read access memory (RAM) 365, and read only memory (ROM) 366. The controller 160 also comprises memory device interface(s) 161, which contain the necessary hardware and/or software for placing the controller 160 in communication with the plurality of memory devices 130. (As used herein, the phrase "in communication with" could mean directly in communication with or indirectly in communication with through one or more components, which may or may not be shown or described herein.) For example, the memory device interface(s) 161 can contain the physical and electrical connectors to simultaneously host the plurality of memory devices 130, or it can contain the physical and electrical connectors to host a separate card reader, which can simultaneously host the plurality of memory devices 130. The controller 160 further comprises server interface(s) 162, which contain the necessary hardware and/or software for placing the controller 160 in communication with the TEK server 110 and the content server 120. For example, the server interface(s) 162 can contain one or more network jacks.

Figure 2:
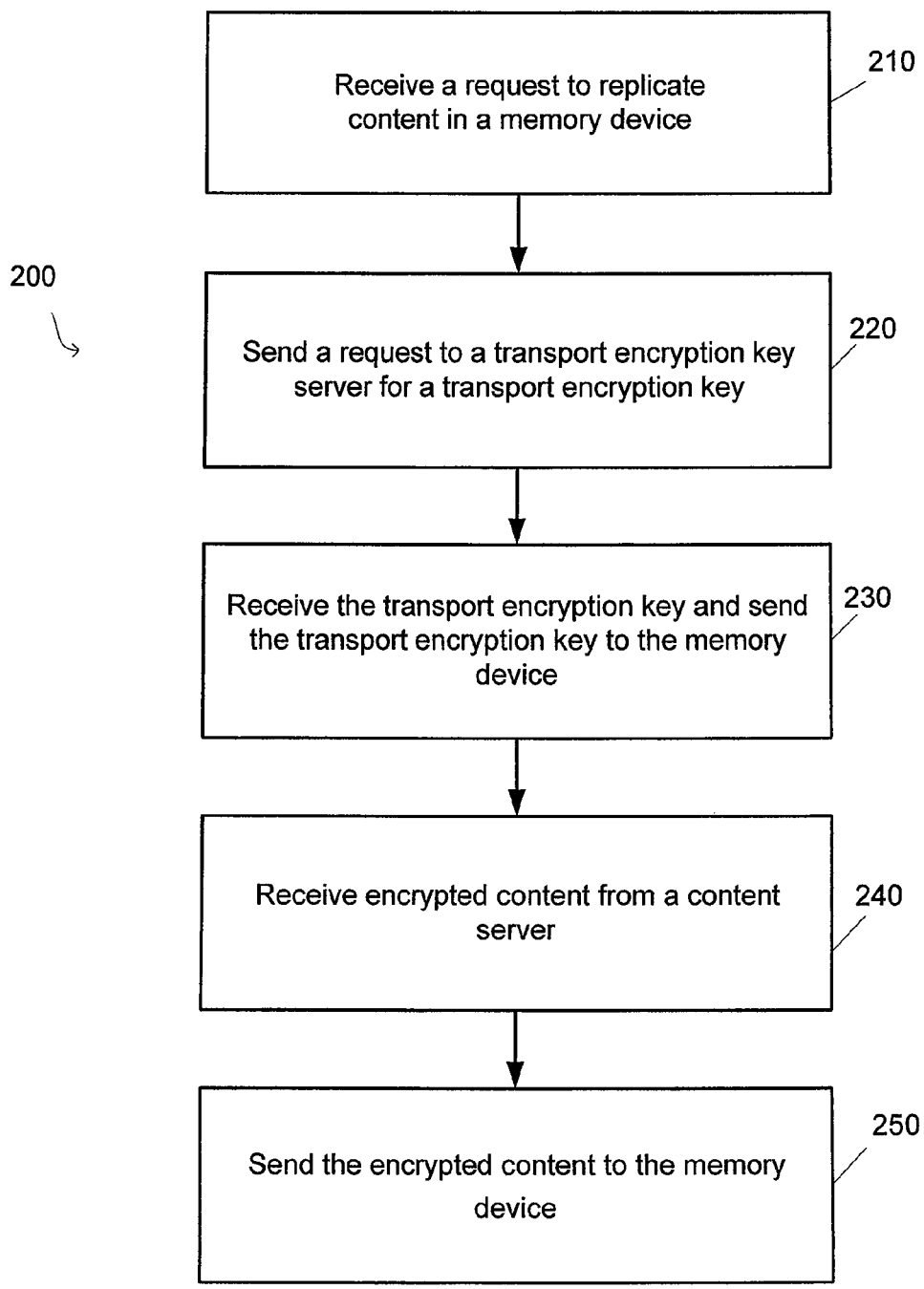
FIG. 2 is a flow chart of a method of content replication control of an embodiment.

FIG. 2 is a flow chart 200 of a method of content replication control using the content replication system 100 of FIG. 1. First, the content replication system 100 receives a request to replicate content in the plurality of memory devices 130 (act 210). This request can be received from a user via the user input device(s) 140 and can contain, for example, a replication session ID, a manufacture ID, the title of the content to be replicated, and the number of memory devices to receive the content.

As mentioned above, in this embodiment, each memory device is associated with a respective unique identifier, and the content replication system 100 provides a given memory device with the TEK needed to decrypt the content only if the unique identifier of the memory device is authorized to receive the TEK. It is this connection between memory device identifier and TEK that allows a content owner to have precise control over how many copies of content are being made once the content image is released to the replication facility. Acts 220 and 230 relate to the process of providing a memory device with a TEK, when appropriate. Specifically, for each of the plurality of memory devices, the content replication system 100 sends a request to the TEK server 110 for the TEK (act 220). The request including the unique identifier of the memory device. In one embodiment the unique identifier of the memory device is passed through authentication (mutual or otherwise), although other mechanisms can be used. The TEK server 110 would then determine if the unique identifier present in the request is authorized by the content owner to receive the TEK. If the unique identifier is not authorized, that memory device will not receive a TEK and, therefore, not be able to decrypt the content. However, if the unique identifier is authorized to receive the TEK, the content replication system 100 will receive the TEK and send it to the memory device (act 230). (The TEK can be received from the TEK server 110 or from another device.) As mentioned above, acts 220 and 230 would be performed for each memory device in the plurality of memory devices 130. These acts can be performed for each memory device one-at-a-time, or the TEK can be sent to all memory devices in parallel, e.g., if the content replication system 100 is a certified device with the credentials to authenticate to the TEK server 110 and to memory devices, such as when the content replication system 100 generates a secure channel key to all memory devices in order to broadcast a TEK encrypted by the secure channel key (e.g., using a parallel replication machine for gang programming).

Either before or after the authorized memory devices receive the TEK, the content replication system 100 receives content encrypted with the TEK from the content server 120 (act 240) and sends the encrypted content to the plurality of memory devices 130 (act 250). If a memory device did not receive a TEK (because it was not authorized to receive a TEK), that memory device will not be able to decrypt the content. It is because of this that these embodiments provide a "best of both worlds" situation. A content owner can ensure that only authorized memory devices receive content by establishing a point-to-point secure connection with the content server 120 for the duration of the loading of the content into an authorized memory device. However, this approach would be costly and impractical because of the relatively-long time needed to load the content into memory devices in a serial fashion. Because these embodiments use a point-to-point secure connection only to load a TEK based on a unique identifier that is bound to the memory device, the content owner can achieve precise content control over how many copies of content will be made without paying the cost (financial and time) of providing point-to-point loading for the size of the content. Further, because the distributed content is encrypted with a closely-controlled TEK, the content itself can be distributed in a broadcast fashion—even to unauthorized memory devices—because only those memory devices that have the TEK will be able to decrypt and use the content.

As will be discussed in more detail below, if the memory device receiving the TEK and the content encrypted with the TEK is capable of performing double domain encryption, after receiving the TEK and the encrypted content, the memory device can decrypt the encrypted content with the TEK, re-encrypt the content with a key unique to the memory device, and store the re-encrypted content in memory. As used herein, a key "unique" to the memory device can be a key that is purposefully chosen to be truly unique, so as not to be used by other memory devices in a set. A key can also be "unique" to the memory device if the key is a value that is randomized by the memory device (or randomized by another entity and delivered to the memory device). Such a randomized value can be considered "unique" as that term is used herein even if it is theoretically possible that another memory device can generate the same random value.

Before turning to a discussion of the use of double domain encryption in content replication control, the following section discusses an exemplary memory device that is capable of performing double domain encryption. As mentioned above, it is important to note that this exemplary memory device can be used in applications other than those related to content replication control.

Memory Device with Double Domain Encryption

Figure 3:
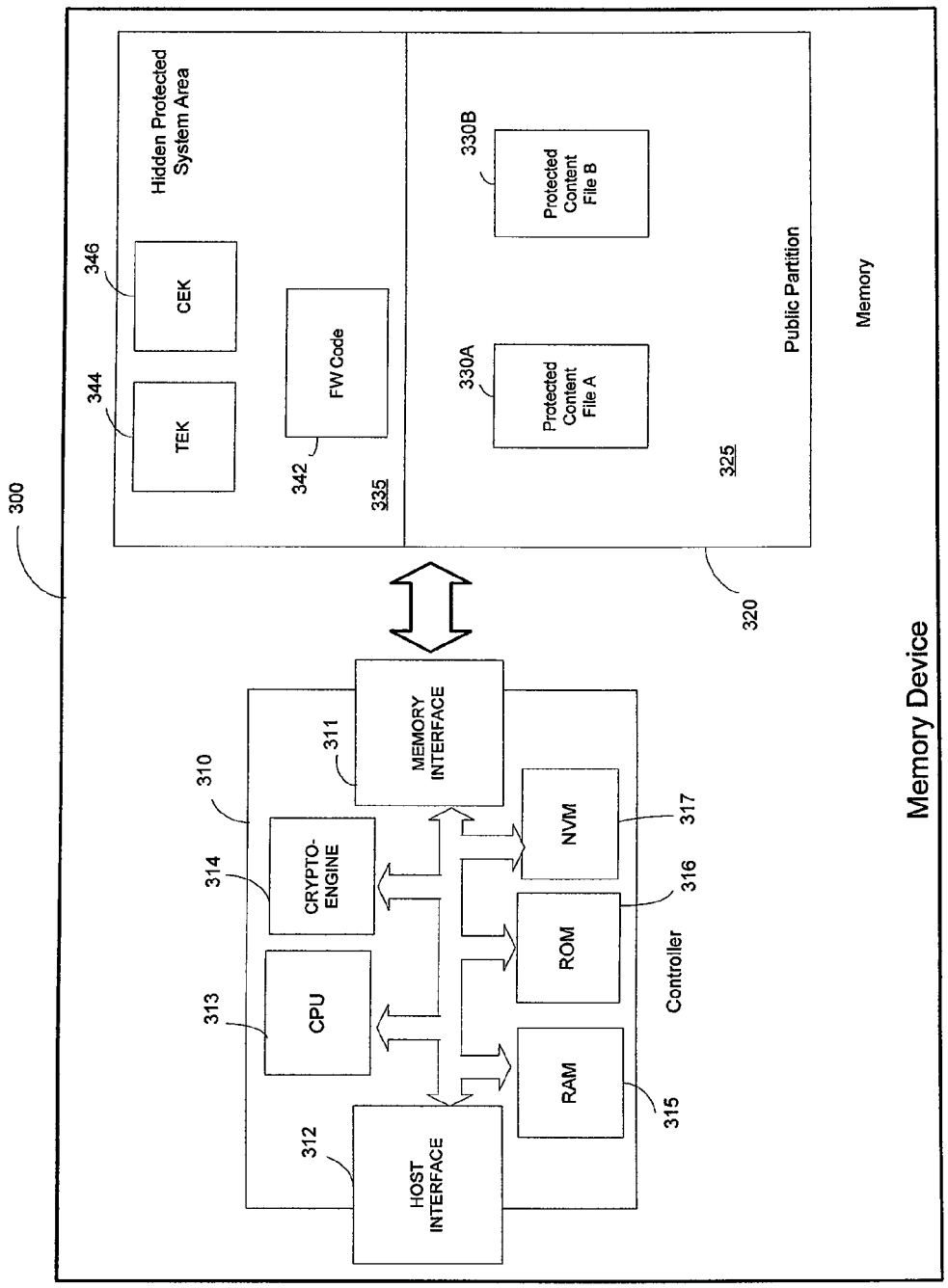
FIG. 3 is a representation of a memory device of an embodiment for performing double domain encryption.

Returning to the drawings, FIG. 3 is an illustration of an exemplary memory device 300 that is operative to perform double domain encryption. As noted above, while this memory device 300 finds particular use in content replication control embodiments, this memory device 300 can be used in applications that are unrelated to content replication control. Accordingly, to the extent that the claims herein are directed to a memory device or a method for use therewith, details of the content replication control embodiments should not be read into those claims unless those details are explicitly recited in those claims. As will be discussed in more detail below, "double domain encryption" is a process by which data is ciphered with one key, deciphered, and then enciphered with another key (e.g., on the fly while the data is being received). The key to re-cipher the data could be generated by the memory device. Double domain encryption keeps distribution of content simple where the content could be ciphered once and received as a regular file, and where it is distributed with a unique storage key, thus decreasing the value of attacking the storage CEK. It should be noted that, at any given time, the content is ciphered only by one key (either the TEK or the CEK). 100291 As shown in FIG. 3, the memory device 300 comprises a controller 310 and a memory 320. The controller 310 comprises a memory interface 311 for interfacing with the memory 320 and a host interface 312 for interfacing with the host 350. (The host 350 can be the content replication system 100 of FIG. 1 or can be another device, such as, but not limited to, a dedicated content player, a mobile phone, a personal computer, a game device, a personal digital assistant (PDA), a kiosk, a set-top box, and a TV system.) The controller 310 also comprises a central processing unit (CPU) 313, a crypto-engine 314 operative to provide encryption and/or decryption operations (the crypto-engine 314 can be implemented in hardware or software), read access memory (RAM) 315, read only memory (ROM) 316 which stores firmware for the basic operations of the memory device 300, and a non-volatile memory (NVM) 317 which stores a device-specific key used for encryption/decryption operations. In this embodiment, the memory device 300 takes the form of a handheld, removable memory card (or hard drive) that can be interchangeably used in a wide variety of host devices. However, other form factors can be used, such those used for a USB device or a solid-state drive.

The memory 320 can take any suitable form. In one embodiment, the memory 120 takes the form of a solid-state (e.g., flash) memory and can be one-time programmable, few-time programmable, or many-time programmable. However, other forms of memory can be used. In this embodiment, the memory 320 comprises a public partition 325 that is managed by a file system on a host and a hidden protected system area 335 that is internally managed by the controller 310. The hidden protected system area 335 stores firmware (FW) code 342 which is used by the controller 310 to control operation of the memory device 300, as well as a transport encryption key (TEK) 344 and a content encryption key (CEK) 346, which will be described below. (In an alternate embodiment, one or both of the TEK 344 and CEK 346 can be stored in the NVM 317.)

The public partition 325 and the hidden protected system area 335 can be part of the same memory unit or can be different memory units. The hidden protected system area 335 is "hidden" because it is internally managed by the controller 310 (and not by the host's controller) and is "protected" because objects stored in that area 335 are encrypted with the unique key stored in the non-volatile memory 317 of the controller 310. Accordingly to access objects stored in that area 335, the controller 310 would use the crypto-engine 314 and the key stored in the non-volatile memory 317 to decrypt the encrypted objects. Preferably, the memory device 300 takes the form of a secure product from the family of products built on the TrustedFlash™ platform by SanDisk Corporation.

The public partition 325 of the memory stores protected content files 330A, 330B. The content 330A, 330B can be preloaded, side-loaded, or downloaded into the memory 320. While the public partition 325 of the memory 320 is managed by a file system on the host, objects stored in the public partition 325 (such as the content files 330A, 330B) may also be protected by the memory device 100. In this embodiment, both stored content files 330A, 330B are protected by respective content encryption keys 340 stored in the hidden protected system area 335, and those keys 340 are themselves protected by the memory-device unique key stored in the non-volatile memory 317 of the controller 310. Accordingly, to unprotect one of the protected content files (say, content file 330A), the crypto-engine 314 would use the memory-device unique key stored in the non-volatile memory 317 of the controller 310 to decrypt the appropriate content encryption key 340 and then use the decrypted content encryption key 340 to decrypt the protected content 330A.

The memory device 300 and a host (e.g., a server) can communicate with each other via a host interface 312. In one embodiment, for operations that involve the secure transfer of data, the crypto-engine 314 in the memory device 300 and the crypto-engine in a server can be used to mutually authenticate each other and provide a key exchange. The mutual authentication process calls for the server and memory device 300 to exchange unique certification IDs. The server and the memory device 300 can perform a mutual authentication based on PKI, where each memory device has a unique certificate ID. After mutual authentication is complete, it is preferred that a session key be used to establish a secure channel for communication between the memory device 350 and the server. It should be noted that single authentication can also be performed, where a server authenticates the memory device in order to load the TEK. This saves time for each memory device given that the memory device is blank and does not care to validate the server. A secure session key can be generated after single-side authentication.

The controller 310 can be implemented in any suitable manner. For example, the controller 310 can take the form of a microprocessor or processor and a computer-readable medium that stores computer-readable program code (e.g., software or firmware) executable by the (micro)processor, logic gates, switches, an application specific integrated circuit (ASIC), a programmable logic controller, and an embedded microcontroller, for example. Examples of controllers include, but are not limited to, the following microcontrollers: ARC 625D, Atmel AT91SAM, Microchip PIC18F26K20, and Silicon Labs C8051F320. Examples of various components that can be used in a controller are described in the embodiments discussed herein and are shown in the associated drawings. The controller 310 can also be implemented as part of the memory 320 control logic.

Figure 4:
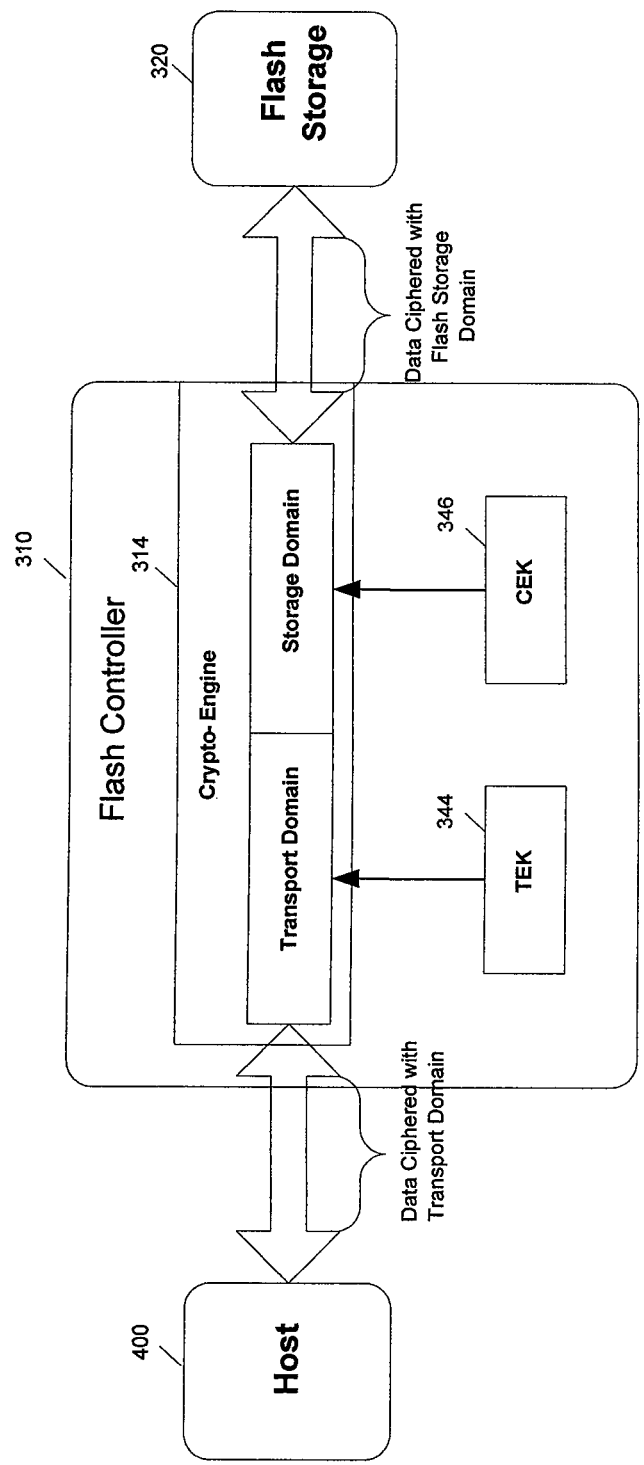
FIG. 4 is an illustration of a double domain encryption technique of an embodiment.
Figure 5:
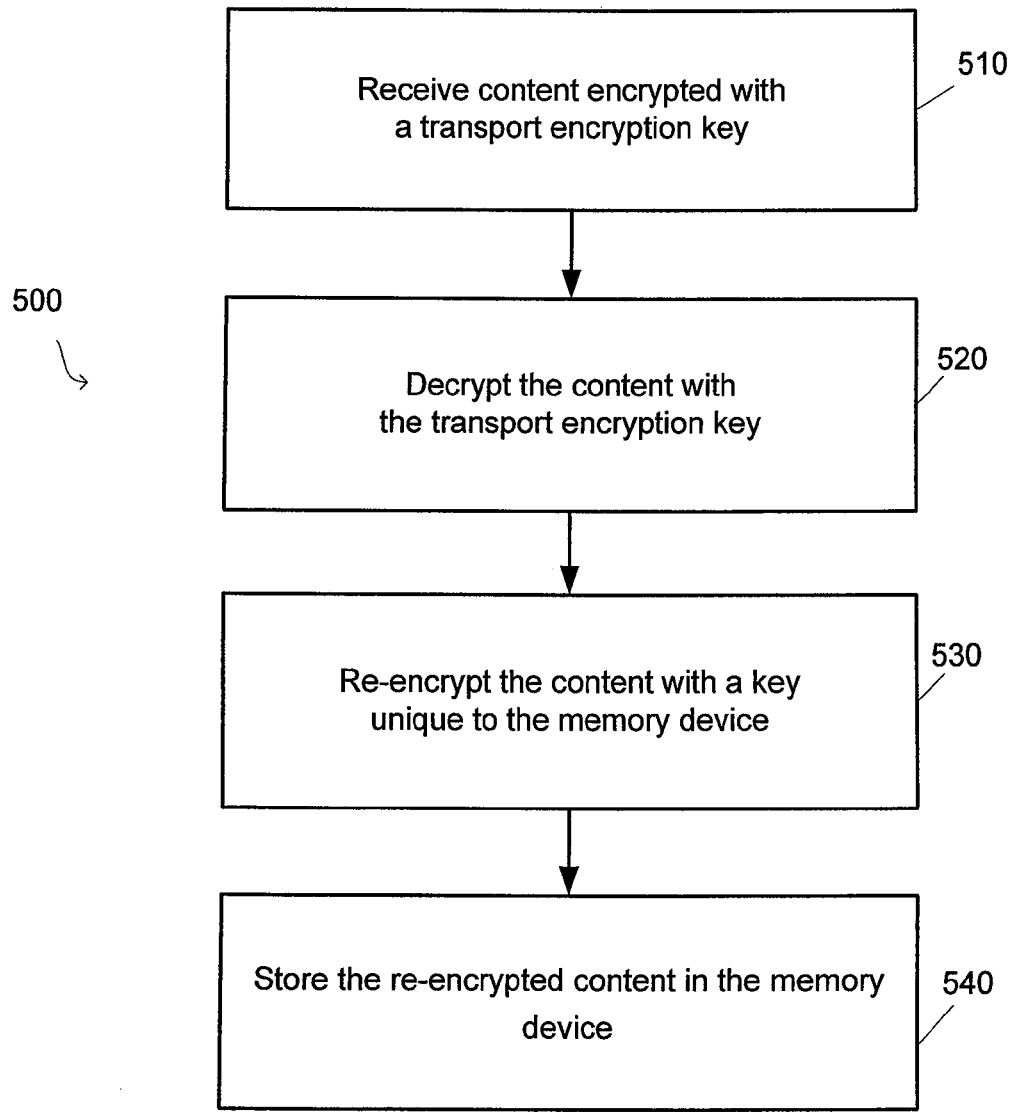
FIG. 5 is a flow chart of a method for performing double domain encryption in a memory device of an embodiment.

As mentioned above, in this embodiment, the crypto-engine 314 in the memory device 300 is capable of performing double domain encryption. The "double domain" in "double domain encryption" refers to the transport domain (the encryption used to protect the content during transmission to the memory device 300) and the storage domain (the encryption used to protect the content when it is stored in the memory device 300). FIG. 4 illustrates the concept of double domain encryption and will be discussed in conjunction with the flow chart 500 of FIG. 5.

First, content (data) encrypted with a TEK is received from a host 400 (act 510). This data is ciphered with the transport domain in that the content is encrypted with the TEK to protect the content during transmission from the host 400 to the memory device 300. When the content is received at the memory device 300, the crypto-engine 314 in the controller 310 of the memory device 300 decrypts the content with the TEK 344 stored in the memory device 300 (act 520). This converts the content from the transport domain to clear content. (The transport domain uses the TEK 344 to cipher data coming into or going out of the memory device 300.) The crypto-engine 314 then takes the clear content and re-encrypts it with a key unique to the memory device, here the CEK 346 (act 530). This decryption and re-encryption can take place on-the-fly as the content is being received by the memory device 300. This places the content in the storage domain. (The storage domain uses the CEK 346 to cipher data written into or read out of the flash memory 320.) The memory device 300 then stores the data ciphered in the flash storage domain in the memory (the flash storage) 320 (act 540).

Double domain encryption enables host/memory device transfer of encrypted data without actually encrypting the channel between them while still achieving memory-device-unique content encryption for storage. This enables the host and memory device 300 to pass data securely between them without having to encrypt the whole session and to achieve uniquely-encrypted content stored in the flash memory 320. In one embodiment, an API that uses this feature is called by an "open stream command," which is available only when the memory device 300 is not engaged in a secure session. The open stream command sets up a security services module for data stream transfers to read or write data. This command determines the characteristics of the data stream and whether to read or write data with or without domain information along with other required data. In one embodiment, one of the arguments in this command specifies the domain for flash encryptions, while another specifies the domain for host/memory device data transport encryption.

As mentioned above, a memory device capable of performing double domain encryption finds particular use with the content replication control embodiments described above. Consider, for example, the situation in which content encrypted by the TEK is stored in the memory device instead of being re-encrypted. In this situation, if an unauthorized party were somehow able to obtain the TEK, that party would have unauthorized access to the content stored in the memory device. By using double domain encryption, a memory device effectively "changes the lock" on the received content, since the stored content would be protected with a different key from the one that protected the content during transport. Accordingly, with double domain encryption, even if an unauthorized party were somehow able to obtain the TEK, that party would not be able to access to the content because the content would no longer be protected by the TEK. This provides an additional layer of content replication control, which may be desired by content owners.

It is important to note that a memory device with double domain encryption can be used in applications other than those relating to content replication control. One of the reasons to use a setup such as "double domain" is to pass a secret/valuable object between two authenticated parties without resorting to a strenuous encryption and secure channel method. A secure channel, which encrypts every piece of information going back and forth between two parties, may take a lot of resources to implement, slow down applications, and consume considerably more power from hosts, such as cell-phones. Double domain alleviates these concerns because it is used to secure specific objects and not the entire communication line. Also, instead of using a single key for all objects being transferred, several different keys can be used for different objects to be transferred. Additionally, there can be multiple entities on one end and a single entity on the other end, separating the users on a single authenticated communication line.

In an alternate embodiment, double domain can be used with an SSL session where the content/data is stored protected with a first key and delivered to the other party with SSL using another key. Similarly, the content could also be delivered with SSL and stored with another key using double domain. The case where the content is delivered with SSL and where the content is stored as-is and the SSL session key is saved for later use may not be practical if (a) it is too computer intensive to handle so much ciphered data and (b) content provider requirements require content to be kept protected.

Content Replication Control Using a Memory Device with Double Domain Encryption

As noted above, the double domain embodiments described in the previous section find particular use with the content replication control embodiments described above. This section provides several examples of how these embodiments can work together.

Figure 6:
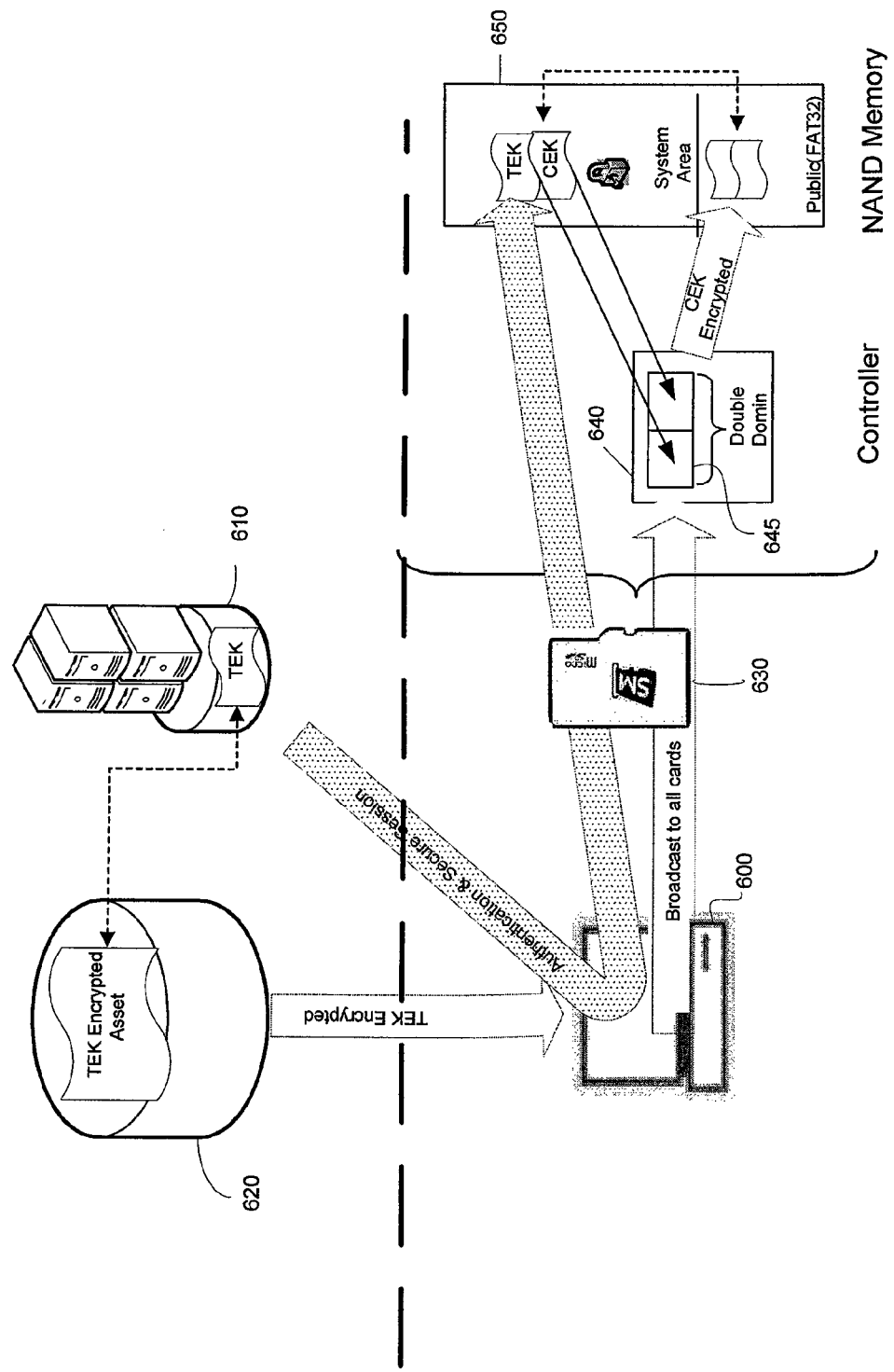
FIG. 6 is an illustration of a content replication control system of an embodiment using a memory device operative to perform double domain encryption.
Figure 7:
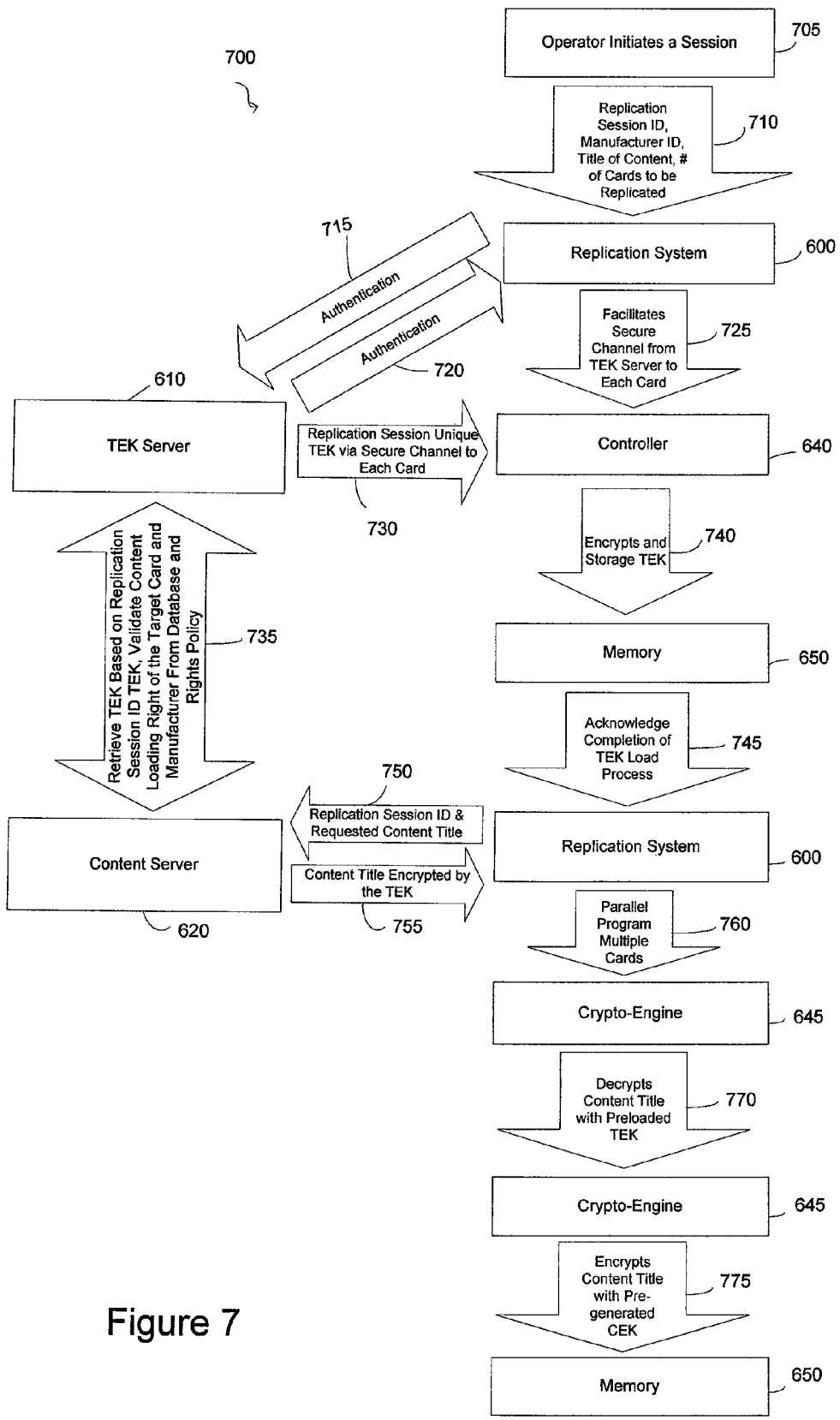
FIG. 7 is a flowchart of a method of content replication control of an embodiment using a memory device operative to perform double domain encryption.

Returning to the drawings, FIG. 6 is an illustration of a system of content replication control of an embodiment using a memory device operative to perform double domain encryption. As with the system 50 shown in FIG. 1, this system comprises a content replication system 600, a TEK server 610, and a content server 620. In this embodiment, these components are placed in communication with each other over the Internet. Also in this embodiment, both the TEK server 610 and the content server 620 are remotely located from the site of the content replication system 600. As explained above and as will be further illustrated below, different arrangements can be used. The operation of this system will now be described in conjunction with the flow chart 700 in FIG. 7.

As shown in the flow chart 700, an operator would initiate a replication session by entering information, such as replication session ID, manufacture ID, title of the content, and the number of memory devices (here, memory cards) to be replicated into the content replication system 600 (act 705, 710). The content replication system 600 and the TEK server 610 then mutually authenticate each other (acts 715, 720). (As noted above, single authentication can also be used.) In this embodiment, authentication and a secure session are established with each memory device to receive content in order to provision the TEK directly to the memory device, and the content replication system 600 facilitates a secure channel and provides a secure pipe of communication between the TEK server 610 and the memory device 130 (act 725). Here, the content replication system 600 never knows of any of the credential information (secrets). The content replication system 600 only facilitates the communications channel. Once authentication takes place, commands and vital data are encrypted and are not sent in the clear.

The TEK server 610 then provides a replication-session unique TEK (e.g., a AES128 TEK) directly and securely into each authenticated memory device via a secure session with memory device controller 640. The TEK server 610 can also log the memory device's unique certificate ID to eliminate duplication and for other uses. Next, the content server 620 synchronizes with the TEK server 610, with the content server 620 retrieving the TEK based on the replication session ID and validating the content loading right of the target memory card and manufacturer against a database and rights policy (act 735). This act can be triggered by the content replication system 600 during, before, or after TEK loading. The TEK server 610 then provides the replication-session-unique TEK to the content replication system 600 to send to the memory device 630 (act 730). Upon receipt, the memory device controller 640 encrypts and stores the TEK in memory 650 (act 740). The memory device 630 will then acknowledge completion of the TEK load process to the content replication system 600 (act 745). The content replication system 600 then sends the replication session ID and the requested content title to the content server 620 (act 750) and receives the content title encrypted with the TEK from the content server 620 (act 755). As noted above, these acts can be done in parallel to act 735. The sequence of acts performed by the content server 620 and the TEK server 610 can be interchangeable as long as the authenticity is validated and the replication session and its TEK are assigned. After this, the content replication system 600 parallel programs the content into multiple memory cards (act 760). The crypto-engine 645 of each memory card then performs double domain encryption by first decrypting the content title with the preloaded TEK (act 770), then re-encrypting the content title with the pre-generated CEK (e.g., the storage encryption key randomized by the memory device), and then storing the re-encrypted content in memory 650 (act 775). (While the memory is shown as being NAND memory in FIG. 6, any type of storage technology can be used, and the memory can be a separate device from the controller 640 performing the double domain encryption.) As discussed above, domain double prevents third parties from cloning an image from one memory device to another since each memory device would have its own content encryption key that makes the image unique. In this embodiment, both the TEK and CEK are encrypted in memory 650 and integrity protected, so those items cannot be changed.

Figure 8:
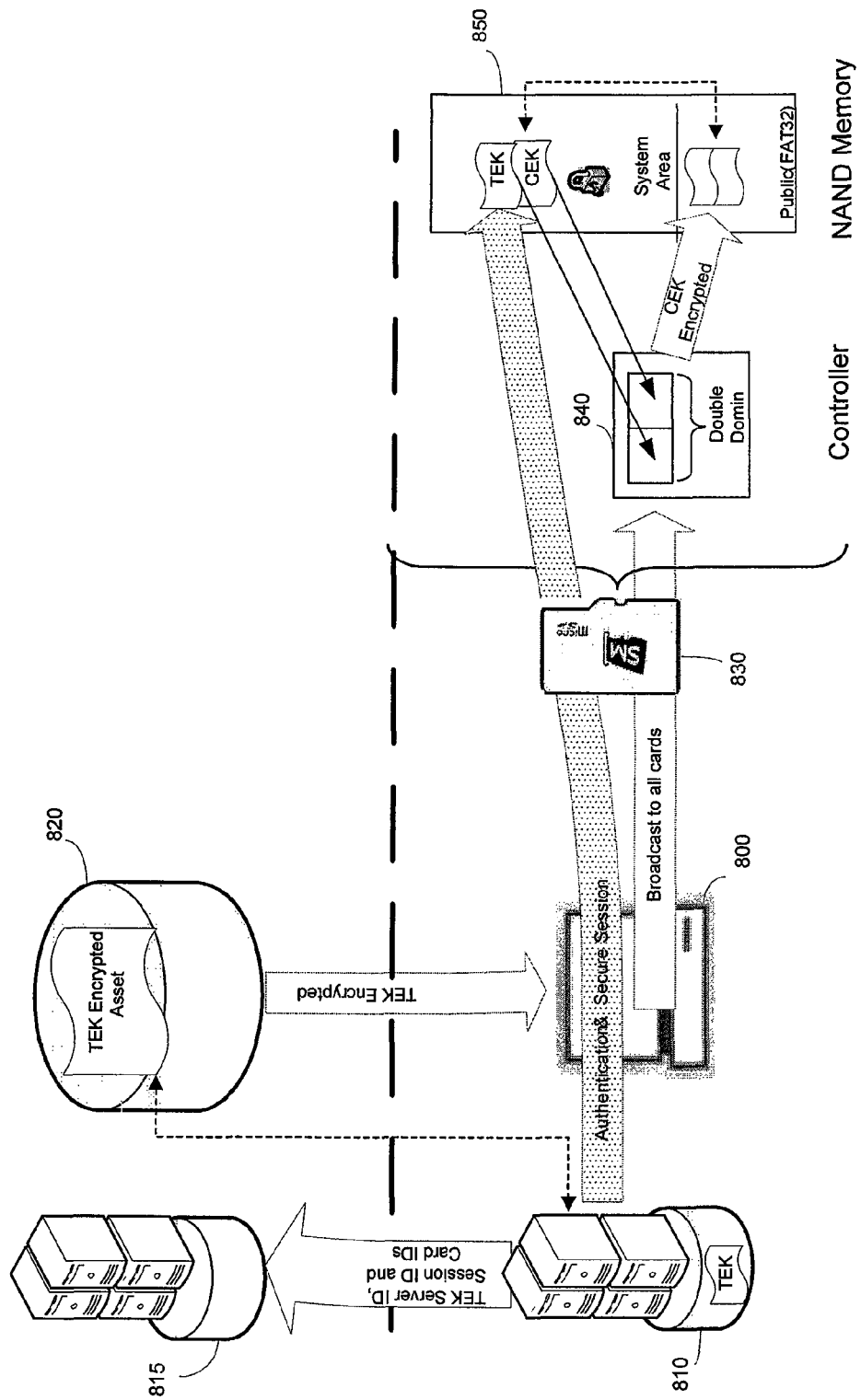
FIG. 8 is an illustration of a content replication control system of an embodiment using a memory device operative to perform double domain encryption.

There are many different alternatives that can be used with these embodiments. For example, while the TEK server 610 and the content server 620 were both remotely located from the site of the content replication system 600, the location of these components can vary. This alternative is shown in FIG. 8, with the TEK server 810 being located at the same site as the content replication system 800, while the content server 820 is remotely located. This alternative also includes a replication management server 815, which receives the TEK server ID the session ID, and the memory device IDs from the TEK server 810 for processing and coordination with the content server 820. Otherwise, the operation of the memory device 830, controller 840, and memory 850 is as described above.

In another alternative, instead of the TEK server being located at the same site as the content replication system or remotely located from the site of the content replication system, the TEK server can be located in the content replication system. For example, the content replication system can double as the TEK server if the content replication system is certified and trusted to do so. If this is the case, the TEK can be loaded into memory devices in parallel with a single TEK protected by the same encryption key provided to all memory devices by the content replication system. Controlling the TEK provides the ability to control and log devices that can be loaded with usable content. This is a desirable element of the production log for content providers.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

What is claimed is:

1. A method for content replication control, the method comprising:
   performing the following in a content replication system having a controller, being physically connected to a plurality of memory devices, and being in communication with a transport encryption key server and a content server:
      receiving, by the controller of the content replication system, a request to replicate content in the plurality of memory devices, wherein each memory device is associated with a respective unique identifier;
      performing by the controller of the content replication system for each of the plurality of memory devices one memory device at a time:
         receiving, by the controller of the content replication system, a unique identifier of the memory device;
         sending, by the controller of the content replication system, a request to the transport encryption key server for a transport encryption key, wherein the controller of the content replication system includes in the request the unique identifier of the memory device;
         receiving, by the controller of the content replication system, the transport encryption key; and
         sending, by the controller of the content replication system, the transport encryption key to the memory device via a secure channel;
         wherein the controller of the content replication system sends transport encryption keys to authorized memory devices on an individual memory-device-by-memory-device basis;
      receiving, by the controller of the content replication system, encrypted content from the content server, wherein the encrypted content is encrypted with the transport encryption key; and
      sending, by the controller of the content replication system, the encrypted content to the plurality of memory devices on a broadcast basis over an open channel, wherein the encrypted content is sent by the controller of the content replication system to all of the plurality of memory devices, even to those memory devices that were not authorized to receive the transport encryption key, either before or after sending the transport encryption key to authorized memory devices.

2. The method of claim 1, wherein each of the plurality of memory devices is configured to decrypt the encrypted content with the transport encryption key, re-encrypt the content with a key unique to the memory device, and store the re-encrypted content in the memory device.

3. The method of claim 1 further comprising sending a request to the content server for the content, wherein the request comprises a replication session identifier, and wherein the content server communicates with the transport encryption key server to obtain the transport encryption key associated with the replication session identifier and encrypt the content with the transport encryption key.

4. The method of claim 1 further comprising, for each of the plurality of memory devices, facilitating mutual authentication of the transport encryption key server and the memory device.

5. The method of claim 1 further comprising, for each of the plurality of memory devices, facilitating authentication of the memory device to the transport encryption key server.

6. The method of claim 1, wherein the transport encryption key server and the content server are both remotely located from a site of the content replication system.

7. The method of claim 1, wherein the transport encryption key server is located at a same site as the content replication system, and wherein the content server is remotely located from the site.

8. The method of claim 1, wherein the transport encryption key server and the content server are both located at a same site as the content replication system.

9. A content replication system comprising:
   a first physical interface configured to physically connect with a plurality of memory devices, wherein each memory device is associated with a respective unique identifier;
   at least one additional interface configured to communicate with a transport encryption key server and a content server;
   a non-transitory medium storing instructions; and
   a controller in communication with the first interface, the at least one additional interface, and the non-transitory medium, wherein the controller is operative of execute the instructions stored in the non-transitory medium, wherein executing the instructions causes the controller to perform the steps of:
      receiving a request to replicate content in the plurality of memory devices;
      performing for each of the plurality of memory devices one memory device at a time:
         receiving, by the controller of the content replication system, a unique identifier of the memory device;
         sending, by the controller of the content replication system, a request to the transport encryption key server for a transport encryption key, wherein the controller of the content replication system includes in the request the unique identifier of the memory device;
         receiving, by the controller of the content replication system, the transport encryption key; and
         sending, by the controller of the content replication system, the transport encryption key to the memory device via a secure channel;
         wherein the controller of the content replication system sends transport encryption keys to authorized memory devices on an individual memory-device-by-memory-device basis;
      receiving encrypted content from the content server, wherein the encrypted content is encrypted with the transport encryption key; and
      sending the encrypted content to the plurality of memory devices on a broadcast basis over an open channel, wherein the encrypted content is sent by the controller of the content replication system to all of the plurality of memory devices, even to those memory devices that were not authorized to receive the transport encryption key, either before or after sending the transport encryption key to authorized memory devices.

10. The content replication system of claim 9, wherein each of the plurality of memory devices is configured to decrypt the encrypted content with the transport encryption key, re-encrypt the content with a key unique to the memory device, and store the re-encrypted content in the memory device.

11. The content replication system of claim 9, wherein executing the instructions further causes the controller to perform the follow step:
   sending by the controller a request to the content server for the content, wherein the request comprises a replication session identifier, and wherein the content server communicates with the transport encryption key server to obtain the transport encryption key associated with the replication session identifier and encrypt the content with the transport encryption key.

12. The content replication system of claim 9, wherein for each of the plurality of memory devices, the controller facilitates mutual authentication of the transport encryption key server and the memory device.

13. The content replication system of claim 9, wherein for each of the plurality of memory devices, the controller facilitates authentication of the memory device to the transport encryption key server.

14. The content replication system of claim 9, wherein the transport encryption key server and the content server are both remotely located from a site of the content replication system.

15. The content replication system of claim 9, wherein the transport encryption key server is located at a same site as the content replication system, and wherein the content server is remotely located from the site.

16. The content replication system of claim 9, wherein the transport encryption key server and the content server are both located at a same site as the content replication system.

* * * * *